United States Patent
Redding

[15] 3,692,429
[45] Sept. 19, 1972

[54] ROTOR STRUCTURE AND METHOD OF BROACHING THE SAME

[72] Inventor: Arnold H. Redding, Export, Pa.

[73] Assignee: Westinghouse Electric Corporation, Pittsburgh, Pa.

[22] Filed: Feb. 1, 1971

[21] Appl. No.: 111,531

[52] U.S. Cl..................416/201, 416/219, 29/156.8
[51] Int. Cl...............................................F01d 5/06
[58] Field of Search..416/198 A, 200, 201, 199, 219; 29/156.8 R

[56] References Cited

UNITED STATES PATENTS

| 2,461,402 | 2/1949 | Whitehead | 416/201 |
| 2,619,318 | 11/1952 | Schaer | 416/200 |
| 2,743,080 | 4/1956 | Feilden | 416/198 A X |
| 3,255,515 | 6/1966 | Clarke | 29/156.8 |

FOREIGN PATENTS OR APPLICATIONS

| 1,140,306 | 11/1962 | Germany | 416/201 |
| 603,578 | 6/1948 | Great Britain | 416/198 A |
| 640,969 | 8/1950 | Great Britain | 416/198 A |

Primary Examiner—Everette A. Powell, Jr.
Attorney—A. T. Stratton, F. P. Lyle and Frank Cristiano, Jr.

[57] ABSTRACT

A method of broaching an axial row of grooves for roots or rotor blades in a multi-stage, frusto-conical rotor structure by inclining the angle of reciprocation of the cutting tool of the broach relative to the periphery of the rotor structure and to the axis of rotation of the rotor. The grooves in the largest diameter land are cut to the full size of the broach, while the succeeding lands are cut with a smaller portion of the cutting tool in a diminishing manner, with the smallest diameter land having blade root grooves of smallest cross-sectional area.

The resulting structure is a rotor having a plurality of increasing diameter lands, each land having an annular row of grooves, the grooves in each land axially aligned with the grooves in the adjacent lands to form a plurality of axial rows of grooves. The grooves in the smallest diameter lands have smaller grooves than those in the largest diameter lands.

9 Claims, 5 Drawing Figures

PATENTED SEP 19 1972 3,692,429

WITNESSES
J. M. Farkas
Bruce L. Samlan

INVENTOR
Arnold H. Redding

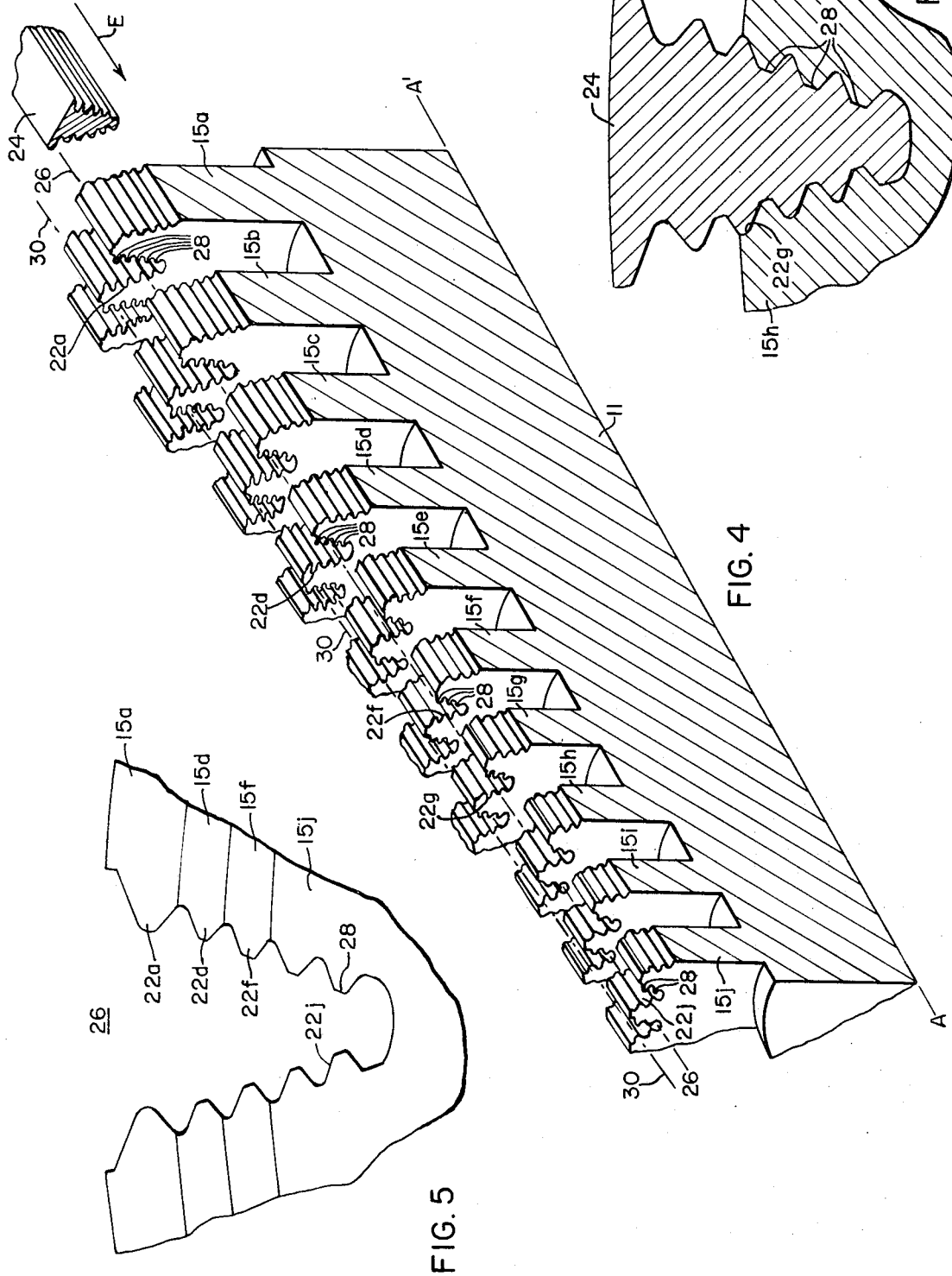
FIG. 4
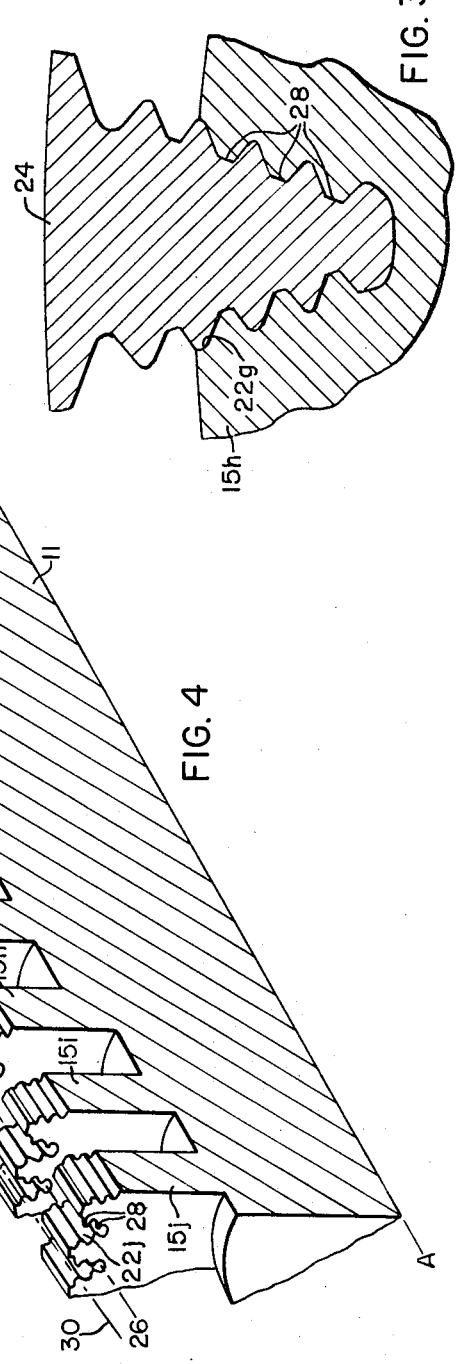
FIG. 3
FIG. 5

3,692,429

ROTOR STRUCTURE AND METHOD OF BROACHING THE SAME

BACKGROUND OF THE INVENTION

The following disclosure relates to a rotor structure and a method of broaching grooves for the root portion of rotating blades in the rotor structure, such as used in a turbine or compressor.

Present practice of manufacturing a solid rotor structure requires that annular, radially extending gaps be machined in the rotor structure, leaving radially extending lands which are annularly shaped and which jointly define the annular gaps. Each land is then individually milled or broached through the gaps in a very time consuming and expensive operation to form an annular row of equally spaced grooves, which are parallel to the axis of rotation of the rotor on the periphery of each land. The cross section of the portion of the land defining each groove corresponds to the cross-section of the root of a turbine rotor blade.

Frusto-conically shaped rotors for turbines or compressors, having diminishing sized grooves for the roof portions of the blades because the smaller blades have smaller root portions than the larger blades. Correspondingly then, it is common in large multi-stage rotor structures to have a different number of grooves in the annular rows, the smaller lands having fewer number of grooves and blades than the larger lands. Furthermore, the grooves in the smaller lands are generally of different size and shape than the larger size grooves.

It is desirable to minimize the amount of milling required because of the high costs associated therewith, and replace it with a less expensive broaching process. It is furthermore desirable to reduce the total broaching time required on the rotor structure by designing a multi-stage rotor structure having a plurality of lands defining corresponding annular rows of grooves, the grooves arranged with grooves in adjacent annular rows to form axial rows of grooves.

SUMMARY OF THE INVENTION

In accordance with the present invention, there is provided a structure and method of broaching grooves in an axial direction (substantially parallel to the axis of rotation of the rotor structure) in a multi-stage rotor structure having a plurality of rows of annular gaps defined by radial extending annular lands. The angle of attack or reciprocation of the cutting tool of a broaching machine is inclined at an acute angle relative to the periphery of the rotor structure and axial grooves are cut in the lands of the rotor structure so that the groove in the largest diameter land on the rotor structure is cut to the full size of the cutting tool and the grooves in the succeeding diameter lands are cut to correspondingly smaller sizes of the cutting tool.

The rotor structure comprises a plurality of annular lands, each land having an annular row of axially extending grooves, each annular row having an equal number of grooves, the corresponding grooves in each row being aligned to form axial rows.

This rotor structure and broaching method save considerable time and money over present practices because the milling previously required is eliminated, a whole row of axial grooves in the lands can be broached in a single broaching pass thus minimizing broaching time, it minimizes resulting scrap material, and it helps standardize the size and shape of the blade grooves and corresponding blade roots.

BRIEF DESCRIPTION OF THE DRAWINGS

FIG. 3 is an enlarged sectional view taken along line III—III of FIG. 2;

FIG. 4 is a perspective view of a portion of the rotor structure after broaching and before insertion of the rotor blades; and FIG. 5 is an enlarged end view of a row of grooves shown in FIG. 4 taken normal to slope D—D' of the rotor.

DESCRIPTION OF THE PREFERRED EMBODIMENT

Figure 1:
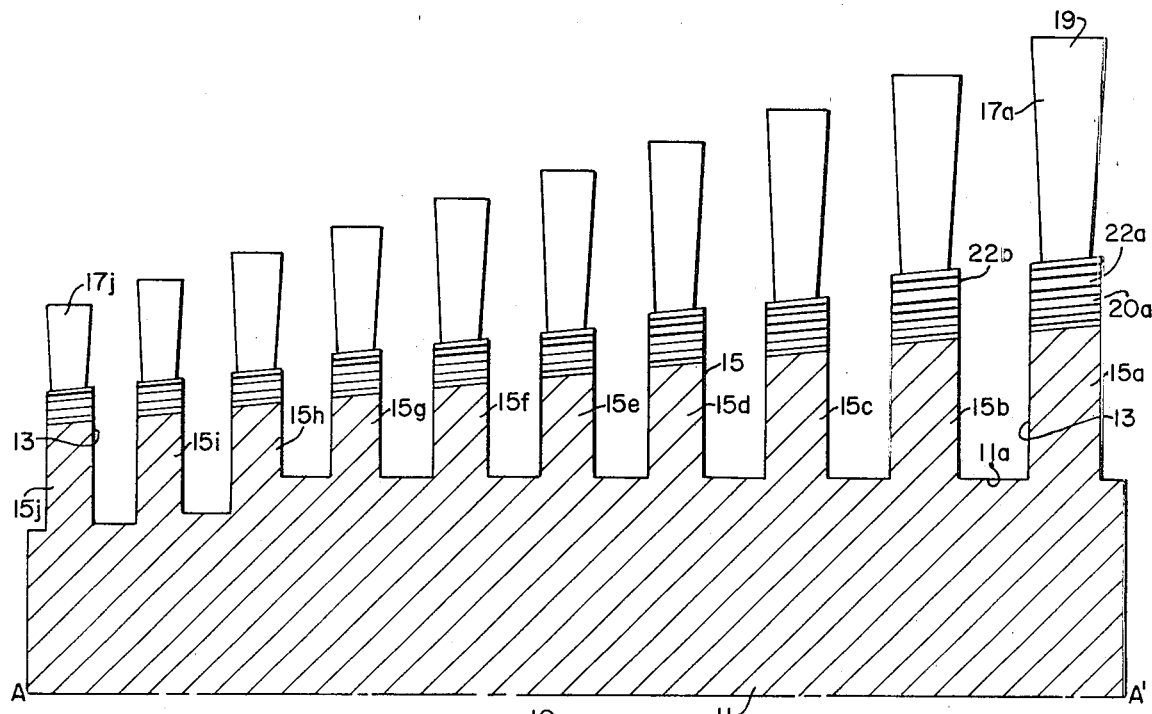
FIG. 1 is a longitudinal sectional view, in simplified form, of one half of a turbine rotor structure formed in accordance with the principles of the present invention.

Referring to the drawings, and particularly to FIG. 1, there is shown a multi-stage rotor structure 10, of the axial flow elastic fluid type, such as is typically used for large turbines or compressors. The rotor structure 10 is comprised of a frusto-conical rotor 11, having a central core 11a, only one-half of which is shown, it being understood that the other half is symmetrical around the central axis of rotation AA'. A plurality of annular gaps 13 are machined into the rotor 11 by any suitable process, such as by milling. The gaps 13 are defined by the resultant plurality of annular lands 15 and the central core 11a of the rotor 11. The lands 15 are further identified by alphabetical subscripts 15a through 15j, in decreasing size, where land 15a has the largest diameter and there is a corresponding decrease in size to land 15j.

The rotor structure 10 includes transverse annular rows of blades 17, which are substantially identical to each other, one row corresponding to each land 15. The annular rows of blades 17 are further identified by alphabetical subscripts 17a through 17j corresponding to lands 15a through 15j. Each blade 19 is of the usual airfoil contour, as well known in the art, and is attached to the land is by means of a root portion 20 disposed in a suitable groove 22. The blade roots 20 and grooves 22 are of the well known fir tree cross section and of the side entry type. The blades 19 extend radially outward relative to the longitudinal axis of rotation of the rotor AA' and each annular row 17 constitutes one row of a multi-stage axial flow turbine or compressor.

As previously stated the present practice of manufacturing a conically shaped rotor structure is to mill or broach one axially extending groove at a time in each land until a complete annular row of grooves similar in size and shape is machined. In conventional broaching techniques, the cutting tool is parallel to the longitudinal axis AA' of the working piece and this technique prevents the broaching of an axially extending row of grooves in a frusto-conical shaped rotor.

Figure 2:
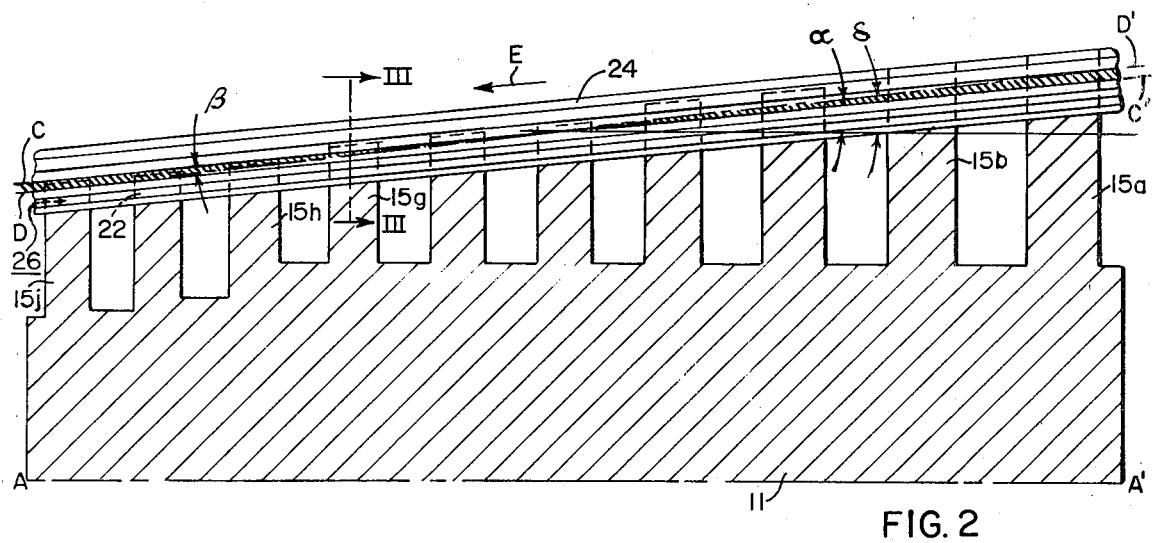
FIG. 2 is a longitudinal sectional view of one half of a turbine rotor structure being broached.

Referring to FIG. 2, the rotor 11 is shown during the broaching operation wherein the cutting tool 24 of the broach is shown cutting a plurality of axial grooves 22 in the lands 15a through 15j of the rotor in a direction from right to left as indicated by the arrow E. The grooves 22 are further defined by subscripts 22a through 22j corresponding to the lands 15a through 15j.

The axial centerline CC' of the cutting tool 24 is inclined at an acute angle $\alpha$ relative to the central axis of rotation AA' of the rotor 11. The slope of the frustoconical rotor is generally designated by the line DD' and is inclined at an acute angle $\delta$ relative to the horizontal or central axis AA' of the turbine. Furthermore, the centerline CC' of the cutting tool 24 is inclined at an acute angle $\beta$ with the slope DD' of the rotor, wherein $\delta - \alpha = \beta$.

The cutting tool 24 of the broach varies in cross section to take a small rough cut at its front portion and a progressively larger cut as it continues to its rear portion, the cross section at its rear portion being the full size finishing section of fir tree root 22a in the largest diameter disc 15a (FIG. 4).

The cutting tool 24 moving in the direction of arrow E, first engages the largest diameter disc 15a and takes a small rough axial cut. Because of the angle of inclination $\alpha$ of the cutting tool 24 relative to the axial centerline A—A', the tool engages the second land 15b, which is of diminishing diameter, and takes an initial cut on that land.

The angle of inclination $\beta$ of the cutting tool 24 relative to the slope D—D' of the rotor provides for slightly smaller cutting engagement of the tool with the second land 15b than the first land 15a, and this decreasing engagement continues to the smallest diameter land 15j so that most of the tool at the smaller diameter end of the rotor is not engaging the land (FIG. 3).

As the tool continues to move, a larger cross sectional portion of the cutting tool 24 engages the largest diameter and 14a and cuts a slightly larger groove 22a. The size of the cutting tool increases and the largest land 15a is eventually cut to the full size and shape of the cutting tool. The succeeding smaller diameter lands are cut with corresponding smaller portions of the cutting tool 24 in a diminishing manner or the depth of the cut is directly proportional to the diameter of the land, because of the angle of inclination $\delta$.

Although the rotor structure 10 shown is of frustoconical shape, it is not limited thereto. For example, the rotor structure can be cylindrically shaped.

In FIG. 4, the largest diameter land 15a has a groove 22a having five ridges 28, a smaller diameter land 15d has four ridges 28, land 15f has three ridges and the smallest diameter land 15j has two ridges. Although the groove 22j is smaller than grooves 22f, 22d, 22a, the groove 22j is similar in size and shape to the corresponding portions of the other grooves 22f, 22d and 22a (FIG. 5) i.e. the two-ridge groove 22j is similar in size and shape to the bottom two-ridges of groove 22f, 22d and 22a. Similarly a three-ridge groove 22f is similar in size and shape to the bottom three-ridges of groove 22d and 22a.

FIG. 3 shows a section through land 15g (FIG. 2) having a three ridge groove 22g (FIG. 4) with the cutting tool 24 projecting partially in the groove and partially out of the groove so that it does not cut the groove with the full section of the cutting tool. It can be seen in FIG. 2, that more of the cutting tool 24 is outside of the groove 22j in the smallest diameter land 15j, than is cutting the land.

Referring to FIG. 5 which is an end view of the axial row 26 of grooves 22, it can be clearly seen that there is a gradual increase in height of the radially extending lands 15j through 15a.

The rotor structure 10 as shown in FIG. 1 is designed so that smaller blades 17j are inserted in the smaller diameter end of the rotor (which is the high pressure end if it is a turbine rotor). The smaller blades 17d have corresponding smaller roots 20d than the roots 20a of the larger diameter blades 17a, and which blades 17a are disposed in the larger diameter end of the rotor (which is the low pressure end if it is a turbine rotor). By proper selection and design, the same number of low pressure blades can be inserted into the low pressure and of the rotor as in the high pressure end, for although the circumference is smaller at the lower pressure end, the blades and blade roots are also smaller.

After the broaching of row 26 of grooves 22a–j is completed, the rotor 11 is rotated, and a subsequent row 30 of grooves is broached (FIG. 4). This is continued until a plurality of equally spaced, axial rows of grooves are broached around the entire periphery of the lands 15.

It can now be seen by using this broaching method herein described, a new article of manufacture has resulted: namely a rotor structure having multiple stages in which there is a plurality of axially extending rows of grooves, concentrically aligned relative to a central axis, each row of grooves having a portion of the grooves similar to a portion of the larger grooves, and each annular row of grooves being equal in number and similar size and shape. Furthermore, each annular row of grooves has an equal number of blades.

As can be seen, this creates a substantial number of advantages in manufacturing which results in substantial savings in time and money. Furthermore blade roots can be substantially standardized for multiple stages in the same rotor structure. Although only one embodiment has been shown, it will be obvious to those skilled in the art that certain modifications may be made within the scope of the disclosure. As an example, although fir tree root blades has been shown, other well known designs of blades of the side entry type may also be used, and although the rotor has been shown to be a solid rotor the rotor structure could be a plurality of discs fastened by any suitable means. Therefore, it is intended that all the matter contained in the foregoing description or shown in the accompanying drawings shall be interpreted as illustrative and not in a limiting sense.

What is claimed is:

1. A method of cutting grooves in a multi-stage rotor structure comprising the steps of:
    a. inclining the angle of attack of the cutting tool relative to the periphery of the rotor structure;
    b. relatively moving the cutting tool along a line forming an acute angle with respect to the axis of the rotor and into engagement with the rotor structure; and
    c. cutting the grooves in the rotor structure so that the end adjacent the rotor structure is cut to the full size of the cutting tool, while the succeeding portions of the rotor are cut with a corresponding smaller portion of the cutting tool.

2. The method recited in claim 1 and further including the initial step of machining the rotor structure to form a plurality of annular gaps defined by radially extending annular lands.

3. The method recited in claim 1, wherein broaching is the method of cutting.

4. The method recited in claim 1 and further including the steps of:
 a. machining the rotor structure to form a plurality of annular gaps defined by radially extending lands, and
 b. broaching the lands so that a portion of the cutting tool cutting the land adjacent the cutting tool does not cut the land furthest from the cutting tool.

5. The method recited in claim 1 wherein the rotor structure is frusto-conically shaped so that step 1 (c) further comprises cutting the grooves so that the largest diameter end of the rotor structure is cut to the full size of the cutting tool while the diminishing diameter potions of the rotor are cut to a corresponding smaller size of the cutting tool.

6. A multi-stage rotor structure for carrying a plurality of blades in an axial flow multi-fluid utilizing machine said rotor structure comprising:
 a plurality of radially extending lands;
 each of said lands defining an annular array of equally spaced and axially disposed grooves for carrying blades having roots of the side entry type;
 each of said arrays having an equal number of grooves
 and said array of groves in each land being aligned axially with corresponding arrays of grooves in the other lands to from a plurality of axial rows of grooves,
 said lands varying in diameter, and
 the depth of the grooves in each land being a direct function of the outer diameter of the land so that the larger diameter lands have deeper grooves and the grooves in the smallest diameter land is duplicated in a portion of the other lands.

7. The structure recited in claim 6, wherein the grooves in each array are uniform in cross section and are equally spaced from the axis of rotation of the rotor structure.

8. The structure recited in claim 6, wherein the rotor structure is frusto-conically shaped so that the lands are of diminishing cross section from one end to the other.

9. The structure recited in claim 6, wherein the rotor structure is frusto-conically shaped and the grooves in the lands are of diminishing cross-section corresponding to the diminishing diameter of the lands.

* * * * *